June 11, 1929.  R. V. McCURDY ET AL  1,716,453

FLOOR POLISHER

Filed Jan. 11, 1927

Inventors
R. V. McCURDY.
C. H. McCURDY.

By Emil F. Lange

Attorney

Patented June 11, 1929.

1,716,453

UNITED STATES PATENT OFFICE.

RAYMOND V. McCURDY, OF SACRAMENTO, CALIFORNIA, AND CLIFFORD H. McCURDY, OF LINCOLN, NEBRASKA.

FLOOR POLISHER.

Application filed January 11, 1927. Serial No. 160,502.

Our invention relates to floor polishers, it being our object to provide an electrically driven floor polisher which may be easily moved about the room to spread the wax on the floor, the device being light in weight and having a brush actuating mechanism which materially assists in the forward propulsion of the floor polisher.

Having in view these objects and others which will be pointed out in the following description, we will now refer to the drawings, in which Figure 1 is a view in perspective of our floor polisher, parts being broken away to disclose the interior construction.

Figure 1:
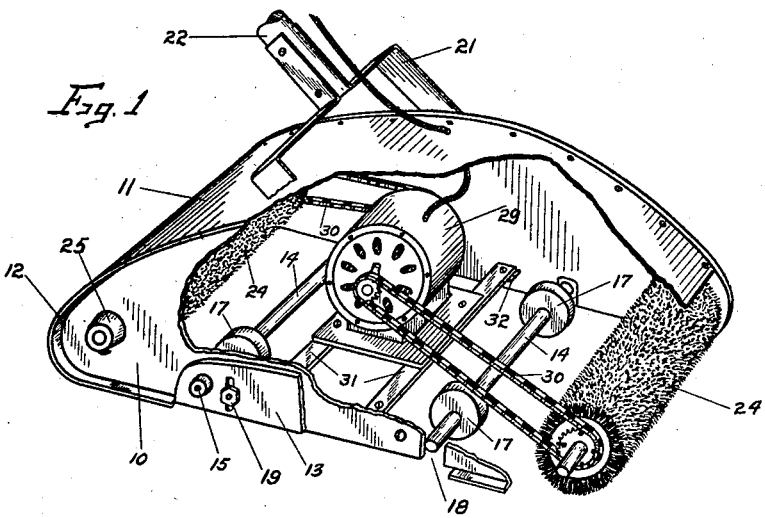

The floor polisher comprises a frame which is mounted on a truck and which supports a pair of rotary brushes with means for propelling the brushes and having a handle whereby the entire floor polisher may be moved about from place to place. The frame includes two side plates 10 which are internally flanged at their upper edges, a cover 11 of sheet metal being secured by means of screws to the flanges. The plates 10 are also heavily ribbed on their outer surfaces throughout almost their entire edges at 12, the rib 12 being designed for strengthening purposes. The rib is interrupted at the middle portion of the bottom edge to permit adjustment of the side plates 13 of the truck. The truck as best shown in Figure 1 includes side plates 13 for supporting a pair of shafts 14, the shafts being journalled in bosses 15 on the side plates. These bosses are apertured at 16 for lubrication purposes. Each shaft 14 has secured thereto a pair of supporting wheels 17 which are adapted to carry the entire weight of the floor polisher. The wheels 17 are preferably made from soft rubber or other material which has cushioning effect when the floor polisher is in use. The side plates 10 are cut away at 18 to permit up and down movements of the plates 13, the adjustment in height being made by means of the nuts 19. By this means it is possible to adjust the floor polisher according to the wear on the brushes or to increase or decrease the action of the brushes on the floor.

Figure 2:
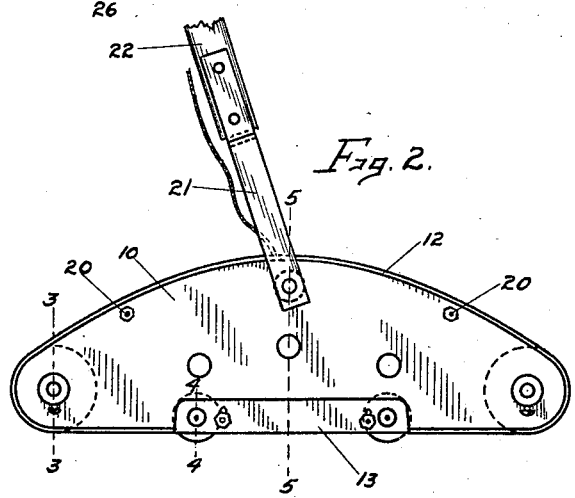
Figure 2 is a view in side elevation of the floor polisher.
Figure 5:
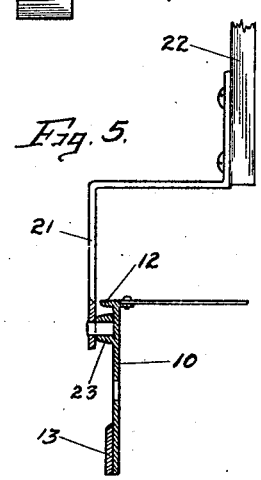
Figure 5 is a sectional view on the line 5—5 of Figure 2.

It should be noted that the frame is relatively low as shown in Figure 2. The handle is secured to the frame at a point considerably above the center of gravity. The handle includes a bail 21 which is connected to the handle proper 22. For securing the bail 21 to the side plates 10, the side plates are provided with bosses 23 which space the arms of the bail so as to clear the rib 12, as best shown in Figure 5.

Figure 3:
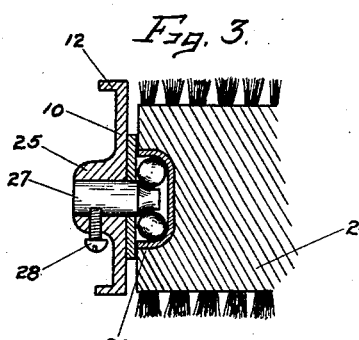
Figure 3 is a sectional view on the line 3—3 of Figure 2.
Figure 4:
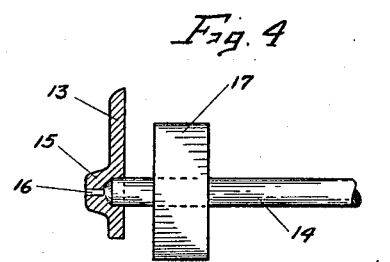
Figure 4 is a sectional view on the line 4—4 of Figure 2.

The polishing element of the floor polisher comprises two rotary brushes 24, one at each end of the frame. These brushes have relatively stiff bristles and they are secured to the frame in the manner shown in Figure 3. The side plates 10 are provided with bosses 25 and the brushes 24 are provided with ball races 26. Short axles 27 pass through the bosses 25 and their inner conical ends are held in the ball races 26. For keeping the axles 27 in position, set screws 28 pass through suitable apertures in the bosses 25 and against the axles.

The brushes 24 are driven by the electric motor 29 through sprocket chains 30 which travel over sprocket wheels at the opposite extremities of the shaft of the motor 29. It should be noted that both brushes 24 are driven in the same direction so that they assist materially in propelling the entire floor polisher over the floor. The motor 29 rests on two bars 31 which are secured to inwardly projecting lugs 32 on the side members 10.

The floor polisher as above described is light in weight, the entire weight being about twenty pounds. The bearings are made relatively frictionless, and this together with the light weight makes it possible to operate the floor polisher with very little muscular effort and with very little drain on the electric current. Because the brushes both rotate together, a portion of the energy from the motor is used for the forward propulsion, thus still further relieving the operator of unnecessary muscular effort.

Having thus described our invention in such full, clear, and exact terms that its construction and operation will be readily understood by others skilled in the art to which it pertains, what we claim as new and desire to secure by Letters Patent of the United States is:

A floor polishing machine comprising a casing including a pair of side plates having straight bottom edges and semi elliptical top edges, a sheet metal cover secured to said side plates at the top edges thereof, a pair of rotary brushes positioned within the end portions of said casing and having axes journalled in said side plates, a truck including a pair of vertically adjustable members secured to said side plates, slots in said side plates shafts journalled in said vertically adjustable members and movable in the slots and, supporting wheels secured to said shafts, a platform secured to said side plates below the center of mass of said floor polishing machine, a motor carried by said platform, connections for driving said rotary brushes from said motor, all parts of said floor polishing machine being symmetrical with respect to the median vertical transverse plane thereof, and a handle having a bifurcated portion pivotally secured to said side plates directly above the center of mass of said floor polishing machine and beneath the upper extremity thereof.

In testimony whereof we affix our signatures.

RAYMOND V. McCURDY.
CLIFFORD H. McCURDY.